No. 858,463. PATENTED JULY 2, 1907.
F. J. MATCHETTE & C. MOUKOS.
COUPLING.
APPLICATION FILED AUG. 4, 1906.
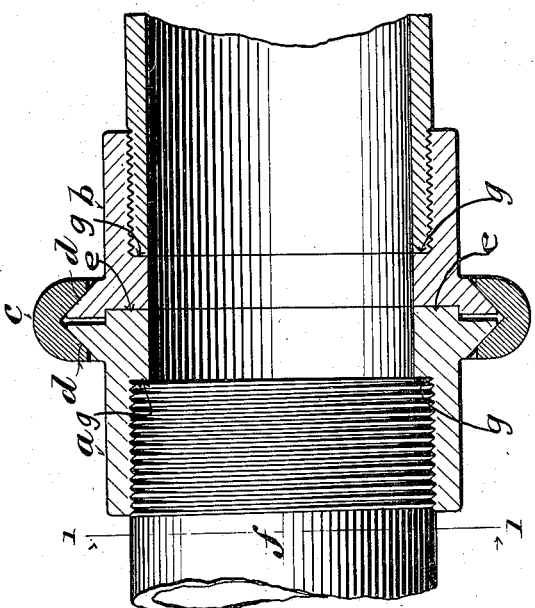
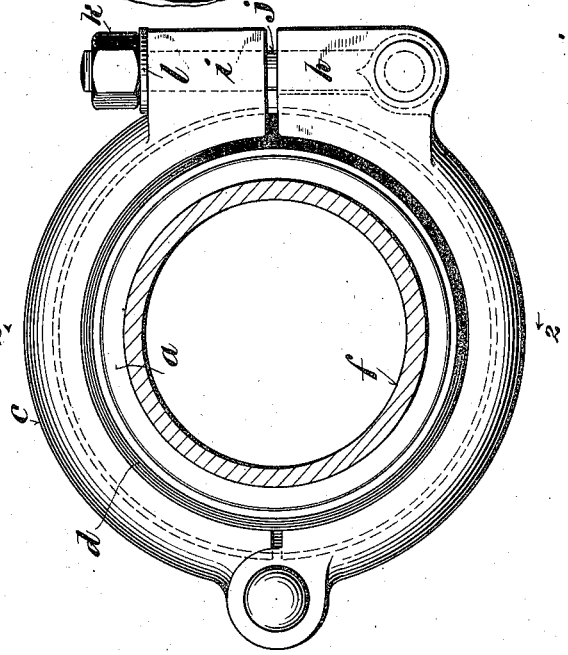
Witnesses:
Geo. W. Young.
Chas. L. Goss
Inventors:
Frank J. Matchette
Charles Moukos.
By Winkler Flanders Smith Bottum & Fawsett
Attorneys.

UNITED STATES PATENT OFFICE.

FRANK J. MATCHETTE AND CHARLES MOUKOS, OF MILWAUKEE, WISCONSIN; SAID MOUKOS ASSIGNOR TO SAID MATCHETTE.

COUPLING.

No. 858,463.  Specification of Letters Patent.  Patented July 2, 1907.

Application filed August 4, 1905. Serial No. 272,626

*To all whom it may concern:*

Be it known that we, FRANK J. MATCHETTE, a citizen of the United States, and CHARLES MOUKOS, a subject of the Kingdom of Greece, both residing at Milwaukee, in the county of Milwaukee and State of Wisconsin, have invented certain new and useful Improvements in Couplings, of which the following is a specification, reference being had to the accompanying drawing, forming a part thereof.

This invention relates to couplings for connecting pipe sections and other similar cylindrical or annular parts. Its main objects are to provide a coupling which can be readily applied and removed to connect and disconnect sections of pipe or the like; to produce and maintain tight joints and a continuous passage of uniform area between the sections when they are so connected; and generally to improve the construction and operation of couplings of this class.

The invention consists in certain novel features of construction and in the peculiar arrangement and combinations of parts as hereinafter particularly described and pointed out in the appended claims.

In the accompanying drawing like characters designate the same parts in the several figures.

Figure 1 is an end elevation of a coupling embodying the invention, one of the pipe sections to which the coupling is applied being shown in cross section on the line 1 1, Fig. 2; Fig. 2 is an axial section of the coupling and parts of pipe sections to which it is applied, on the line 2 2, Fig. 1; and Fig. 3 is a plan view of the coupling.

The coupling consists generally of two annular members $a$ and $b$ and of a clamping ring $c$. The members $a$ and $b$ are formed or provided at their proximate ends with external oppositely beveled flanges or rims $d$, and when the coupling is to be used for connecting pipe sections or the like, one member $b$ is formed with an annular end groove or recess and the other member is formed with a corresponding end tongue or projection $e$ fitting into said groove or recess and adapted to exactly center and hold the connected members and pipe sections or the like in exact alinement with each other. The tongue or projection $e$ is made of such thickness that it will bottom in the corresponding groove or recess before the end faces of the members outside of the tongue and groove come together, thereby making a tight butting joint between the members next to their bore. For connecting pipe sections $f f$ as shown in Fig. 2, both members $a$ and $b$ of the coupling are counterbored to form internal shoulders $g$ against which the ends of the pipe sections abut, the coupling thus forming between the sections a continuous passage corresponding with the bore of the sections.

The clamping ring $c$ is severed to render it expansible and contractible and also to permit of its being readily placed upon and removed from the members which it is designed to connect. For certain purposes, particularly when it is made of spring or flexible metal and of considerable diameter, it may be severed on one side only and sprung or bent sufficiently to bring it into place upon or to remove it from the adjoining members of the coupling; but for other uses it is preferably severed on opposite sides into two parts or sections as shown in the drawing, and these two parts or sections are hinged together at one end. In either case it is provided on the side where it opens with means for drawing its severed ends toward each other and for clamping it upon the members $a$ and $b$, and is formed with an internal groove which is preferably V-shaped or beveled to correspond with the oppositely beveled faces of the flanges or rims $d$ and to force and hold the members $a$ and $b$ snugly together end to end when it is clamped thereon.

For clamping and holding the ring $c$ upon the members $a$ and $b$ it may be formed as shown, at its separable ends with tangentially grooved or notched lugs $h$ and $i$, and provided with an eye bolt or screw $j$, pivoted at one end in the lug $h$ and having a nut $k$ threaded on the other end and adapted to be turned into or out of engagement with the lug $i$. A washer $l$ may if desired, be interposed between the lug $i$ and nut $k$, as shown in Fig. 1.

When the ring $c$ is placed upon the members $a$ $b$ and closed over the flanges or rims $d$, the bolt $j$ is swung on its pivot into the groove or notch in the lug $i$, and the nut $k$ is screwed up against said lug, thereby clamping the ring upon the beveled flanges or rims $d$ and drawing the members $a$ and $b$ tightly together end to end. By slackening the nut $k$ the bolt $j$ is released and can be swung out of engagement with the lug $i$. The ring $c$ can then be spread, thereby releasing the members $a$ and $b$, and the coupled pipe sections or other parts.

It will be observed by referring to Fig. 2 of the drawing that a little clearance or space is left between the flanges or rims $d$ when the parts of the coupling are assembled, so that when the ring $c$ is clamped thereon, the tongue or projection $e$ will be forced against the bottom of the recess in the other member, or the opposing ends of the two members will be brought and held snugly together, thus producing and maintaining a tight joint between them.

Various modifications in the minor details of construction and arrangement of parts may be made without departing from the principle and intended scope of the invention.

We claim:

1. In a coupling the combination of two members having oppositely beveled external flanges and formed at their meeting ends, one with an annular recess and the other with an annular centering projection fitting into said recess, said projection being of greater thickness than the depth of the recess, and a severed contractible ring provided with means for clamping it upon said members and having an internal groove fitting over said flanges and adapted when clamped thereon to draw them toward each other, substantially as described.

2. In a coupling the combination of annular members having oppositely beveled external flanges, counterbored at their outer ends next to their smaller bore and formed at their inner ends one with an annular recess and the other with an annular centering projection fitting in said recess, said projection being of greater thickness than the depth of said recess and a severed contractible ring provided with means for clamping it upon said members and having an internal groove fitting over said flanges and adapted when clamped thereon to draw them toward each other, substantially as described.

In witness whereof we hereto affix our signatures in presence of two witnesses.

FRANK J. MATCHETTE.
CHARLES MOUKOS.

Witnesses:
CHAS. L. GOSS,
BERNARD C. ROLOFF.